May 29, 1951  A. S. FITZGERALD  2,554,945
HEAT REGULATING SYSTEM
Filed July 11, 1947  4 Sheets-Sheet 2

INVENTOR
ALAN S. FITZGERALD
BY
[signature]
ATTORNEY

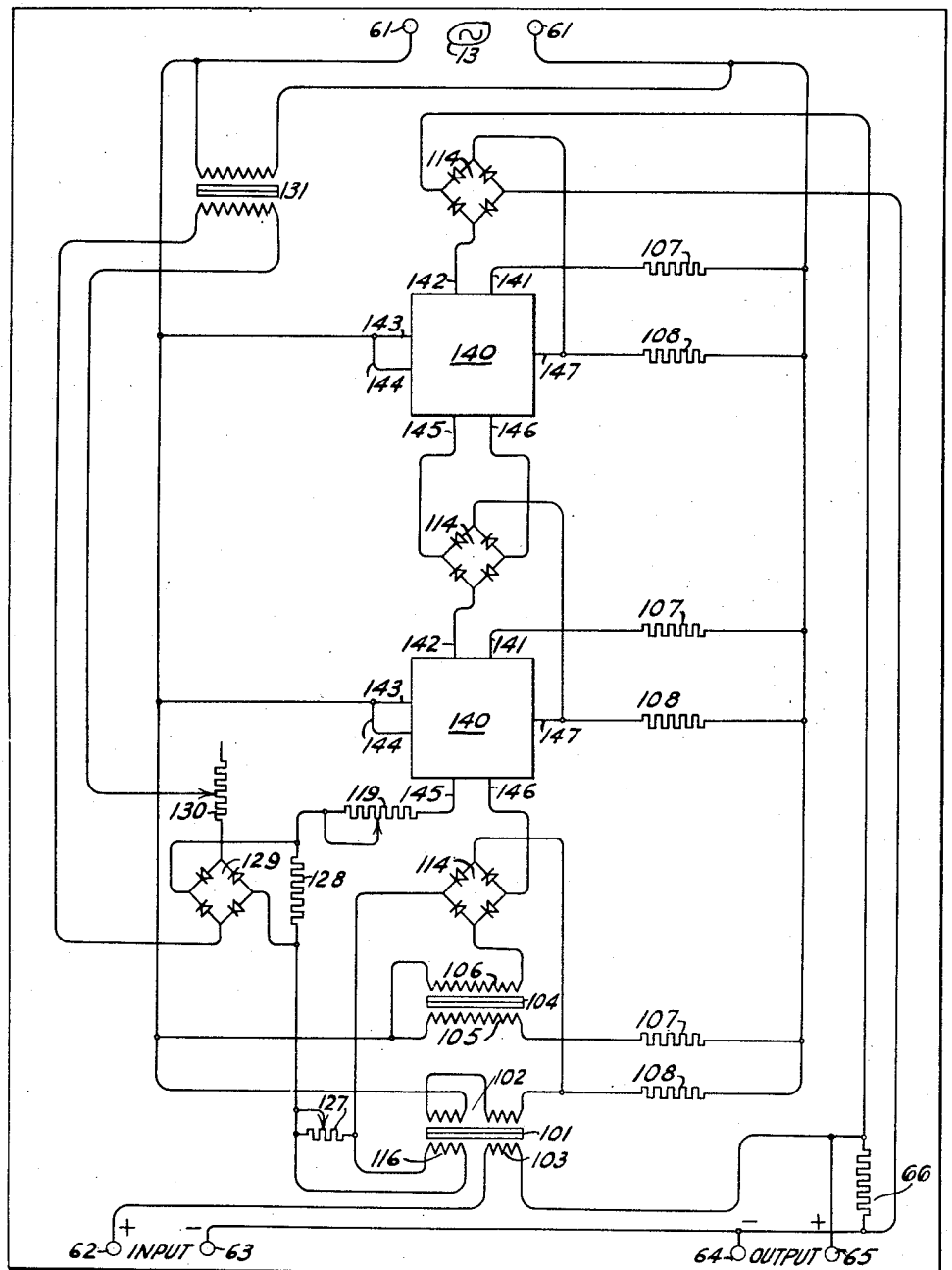

Patented May 29, 1951

2,554,945

UNITED STATES PATENT OFFICE 2,554,945

HEAT-REGULATING SYSTEM

Alan S. Fitz Gerald, Wynnewood, Pa., assignor to Warren Webster & Company, Camden, N. J., a corporation of New Jersey Application July 11, 1947, Serial No. 760,397

4 Claims. (Cl. 236—78)

This invention relates to electrical control systems and more particularly to intermittent systems in which a process or service is interrupted at regular intervals, the mean rate of performance of said process being adjusted by varying the relative periods at which the process is respectively activated and interrupted.

My invention is particularly applicable to heating systems and especially to major heating systems employed in large buildings wherein extensive radiation is installed. It is also applicable to air conditioning and cooling systems, as well as to systems requiring pressure, as pressure differential regulations.

My invention has particular reference to intermittent control arrangements of the type I have described in United States Patent No. 2,477,728, issued August 2, 1949.

In my above-cited application I disclosed magnetic amplifier arrangements for intermittently operating a valve for controlling the supply of a fluid heating medium in accordance with the temperature of a thermal resistance element. The thermal resistance element was included in a bridge circuit and the magnetic amplifier arrangements, and intermittent control apparatus, was controlled in accordance with an out-of-balance E. M. F. derived from said bridge.

In heating systems of the type referred to it is frequently required that a plurality of different controlling effects or functions be provided, all of such controls being actuated by, or dependent upon, temperature.

It is well-known to those skilled in the art that due to inherent self-heating limitations, thermal resistance elements and bridges associated therewith can be energized only at limited power levels. Due to these circumstances the power levels derived from such bridges, and available for control purposes, are of very low order of magnitude. Accordingly, in a system such as for example, that disclosed in my above-cited copending application, while the bridge arrangements shown are entirely effective for accomplishing the desired intermittent control action, should it be desired to provide additional control functions, apparatus furnished for such additional purposes could not be energized directly from the thermal resistance bridge circuit without interfering with the intermittent control action, because of the limited capacity of the bridge to deliver additional output.

It is therefore an object of my present invention to provide thermal resistance temperature responsive bridge arrangements capable of energizing a plurality of control devices or functions.

It is another object of my invention to provide a source of electrical energy controllable in magnitude in accordance with the temperature of a thermal resistance element and of ample capacity for supplying substantial or variable control loads.

These and other novel features which I believe to be characteristic of my invention will be set forth with particularity in the appended claims. My invention itself, however, both as to its organization and methods of operation, together with further objects and advantages thereof, may best be understood with reference to the following description taken in connection with the accompanying drawings, in which:

Fig. 3 is a view showing further details pertaining to the embodiment shown in Fig. 1;

Figure 1:
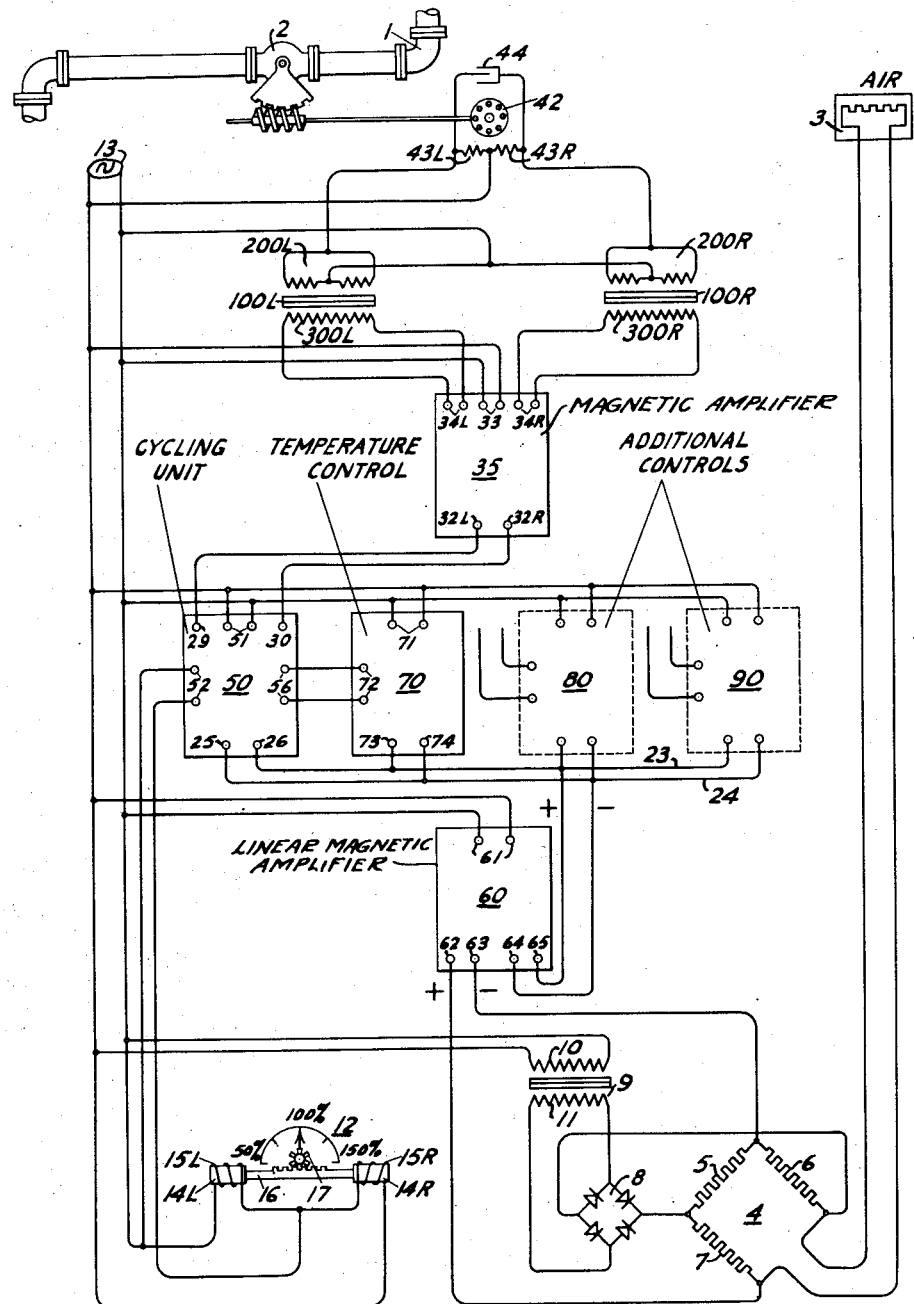
Fig. 1 is an electrical circuit diagram representing an embodiment of my invention applied to a vapor or fluid heating system, for furnishing temperature controlled intermittent action together with additional arrangements, likewise temperature controlled, for modifying the intermittent control, or furnishing additional controlling action.

Referring to the drawings, I show in Fig. 1 a portion of a fluid or vapor heating system 1 including a control valve 2. The valve 2 is actuated through a temperature responsive control system comprising a thermal resistance element 3 mounted at a suitable location out-of-doors so as to be responsive to ambient external temperature. According to my invention the heating medium may, during such periods as are desired, be maintained at a mean temperature which is directly related to the ambient temperature. My control system comprises a bridge circuit 4 including the thermal element 3 and three other resistors of fixed value, 5, 6 and 7. The bridge 4 is energized from an A. C. source 13, through a rectifier 8, and an isolating transformer 9 having a primary winding 10 and a secondary winding 11. I also connect across the source 13 a control device 12 for manually varying the operation of my invention. The control device 12 comprises a variable inductance structure consisting of two solenoids having conjoined plungers 14L, 14R entering into coils 15L, 15R together with manually operable means such as a rack 16 and pinion 17.

I show also in Fig. 1 a cycling unit 50. The cycling unit 50, as shown in greater detail in Fig. 2, includes a cycling device 20 connected to energize a rectifier 21 so as to supply a fluctuating unidirectional current to a resistor 22. I show also in Fig. 1 a linear amplifier 60. The input of the linear amplifier 60 is connected to receive the out-of-balance voltage of the bridge circuit 4. Thus, the input of the linear amplifier is energized in accordance with the temperature to which the thermal resistance 3 is exposed. The linear amplifier 60 receives A. C. supply from the source 13 and delivers an output to a pair of conductors 23 and 24 for supplying any desired number of control units with a voltage which is a function of the temperature measured by the thermal element 3, and which accordingly hereinafter may conveniently be referred to as the "temperature-indicating" voltage. As shown in the drawings, the polarity of the connection is such that conductor 23 is positive with reference to 24. The voltage applied to the conductors 23 and 24 may, if desired, be a multiple of the voltage derived from the bridge 4, to which the input of the linear amplifier is connected; or, alternatively, may be exactly equal to the voltage from the bridge 4, as I have shown in the drawings. However, the linear amplifier 60 has sufficient output power capacity to maintain an output voltage equal to the input voltage despite the fact that the various control units may represent substantial power loads on the linear amplifier 60.

Referring again to Fig. 2 I show a pair of binding posts 25 and 26 for receiving the temperature-indicating voltage applied by the conductors 23 and 24. I show also in Fig. 2 a pair of binding posts 29 and 30. Binding post 30 is connected by a conductor 18R to binding post 25. Binding post 29 is connected by conductor 18L to the upper extremity of resistor 22. The lower extremity of resistor 22 is connected by conductor 19 to an adjustable potentiometer resistor 45, connected between binding posts 25 and 26. The purpose of the potentiometer resistance 45 will be hereinafter explained.

Binding posts 29, 30 are connected to a magnetic amplifier 35 as shown in Fig. 1 for controlling the valve 2.

In brief, the magnetic amplifier 35 has two binding posts 32L, 32R for receiving an input of reversible direct current polarity. The magnetic amplifier 35 also has a pair of binding posts 33 for receiving alternating current, i. e., A. C., supply from the source 13. It has also two pairs of output terminals 34L, 34R for supplying amplified direct current to saturable core devices having cores 100L, 100R, A. C. windings 200L, 200R and D. C. saturating windings 300L, 300R to which terminals 34L, 34R are connected.

The valve 2 is actuated by a motor which may be of the induction type having a rotor 42, windings 43L, 43R and a capacitor 44 energized from the A. C. source 13. When D. C. input is applied to 35 of polarity such that 32R is positive and 32L is negative, current is delivered by 34R to the saturating winding 300R, but no appreciable current is delivered by 34L to 300L under which condition the motor turns in one direction. In Fig. 1, under this condition the motor should operate in the direction which increases the amount of heat delivered. Conversely, if 32L is positive with regard to 32R, the motor will operate in the reverse direction, that is to say, less heat will be furnished to the heating system.

Referring again to Fig. 2, the cycling device 20 which is described in detail in United States Patent No. 2,477,728 comprises two inductance windings 27 and 28 together with two counterpoise inductances of fixed value 270, 280, and two transformers having mid-tapped primary windings 37, 38, and secondaries 39, 40, which are connected together to form two balance circuits. As shown in the diagram the differential circuit including 27 and 270 is energized between the mid-tap on 37 and the junction of 27 and 270, from the A. C. source 13 through a pair of binding posts 51.

Figure 2:
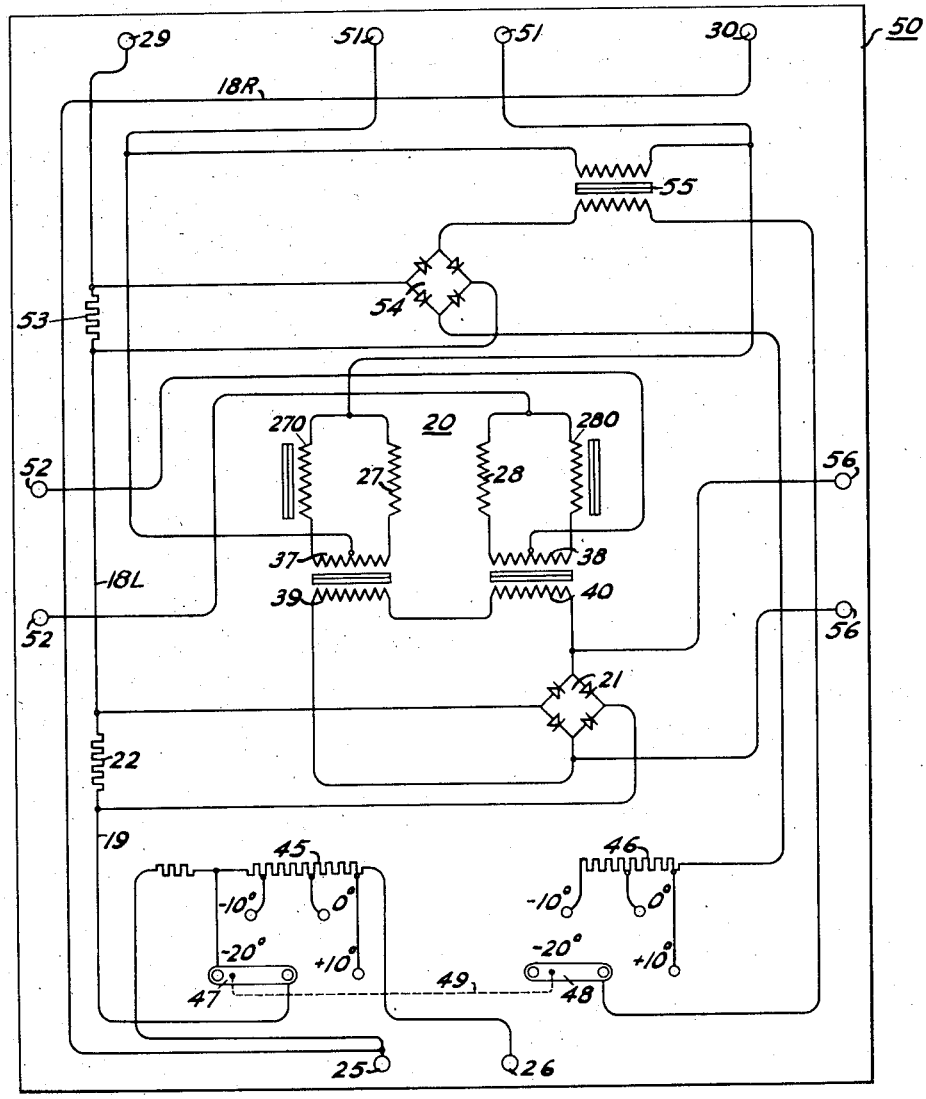
Fig. 2 is a view showing details pertaining to the embodiment shown in Fig. 1.

The other balance circuit is energized through the control device 12. As shown in Fig. 2 the balance circuit which includes 28 and the counter-poise 280 is connected to a pair of binding posts 52 situated on the left-hand side of the cycling unit 50. Referring now to Fig. 1, the binding posts 52 are energized in parallel with the winding 15L of the control device 12. Thus the voltage supplied to the balance circuit which includes 28 and 280 may be varied by adjusting 12. For example, if the plungers 14L, 14R be moved towards the left this voltage will increase; if the plungers are moved towards the right the voltage supplied to binding posts 52 will decrease.

Briefly, the cycling device 20 causes a fluctuating rectified current to flow in the resistor 22. As shown in Fig. 2, the rectifier 21 is connected so that the upper extremity of 22 becomes negative with reference to the lower extremity. Thus the voltage set up across 22 is in opposition to the voltage, received from the linear amplifier 60 at terminals 25, 26, since 25 is negative and 26 is positive. Accordingly, there appears at binding posts 29 and 30 a voltage which is the algebraic sum of resultant of these two voltages.

Thus at times when the temperature-indicating voltage preponderates over the voltage set up across 22, binding post 29 becomes positive with reference to 30. This makes 32L positive in respect of 32R. Accordingly, the motor operates the valve 2 in a direction such as to decrease the amount of heat delivered. On the other hand, when the voltage across 22 is greater than that of the linear amplifier output, which is a function of the temperature, the motor is driven so as to increase the heat. For any given temperature condition the ratio of the "heat on" time to the "heat off" time may be adjusted manually as desired by the control device 12.

I also show in Fig. 2 arrangements for varying the control characteristic in respect of the adjustment referred to by those skilled in the art as the "temperature base."

Resistor 46 is provided with means for selecting a plurality of different resistance values by means of a movable link 48. Likewise resistor 45 is also adjustable by means of a similar link 47. Simultaneous adjustment of the resistors 45 and 46 is accomplished by means of an insulating mechanical coupling indicated at 49.

Briefly, the function of 46 is to effect an arithmetical adjustment; that is to say, 46 determines the temperature at which the bridge is in balance and the bridge output is zero. The function of 45 is proportional; by varying the energization of the bridge 4 it determines the amount of the bridge out-of-balance voltage for any given temperature other than that at which the bridge is in balance. By way of illustration, to accomplish a desired result, it is necessary to set 46 so that the temperature base, that is to say, the temperature at which the bridge is in balance is −20°, −10°, 0, or 10° F., as desired; and to adjust 45 so that at 70° F. the bridge out-of-balance voltage is exactly the same at each of these settings of 46, each of the foregoing temperatures being actual outside temperature values, as described in my issued Patent No. 2,477,728 for "Automatic Temperature Control System," dated August 2, 1949.

It will be noted that due to the use of the linear amplifier in my present invention the resistors 45 and 46 are not connected directly in the bridge circuit since it is not desired that they affect any other control unit except the cycling unit 50. Thus, 45, as shown, is connected as the potentiometer across binding posts 25, 26. When so connected it provides for adjustment of the voltage which opposes the voltage set up across the resistor 22.

Referring now to the resistor 46, it will be understood that its adjustment affects only the cycling unit and this result is brought about by introducing an additional voltage into the circuit which includes the resistor 22 and from which is derived the resultant voltage which is applied to the magnetic amplifier 35. Thus I include in the conductor 18L a resistor 53 receiving rectified current from a rectifier 54 energized in series with resistor 46 from the secondary of a transformer 55. The connections are made so that the lower extremity of 53 is positive.

Accordingly, a normally constant voltage, adjustable by means of 46, is set up across 53, in opposition to the temperature indicating voltage. The difference between this voltage and the temperature indicating voltage may, as desired, be made to be zero at −20°, −10°, 0 or 10° F. The bridge 4 may itself be set to balance at −20° F. Accordingly, in one position of the link 48 the circuit may be open and the voltage across 53 may be zero. Thus, the voltage which opposes the drop across the resistor 22, may be varied by means of 45 and 46, and without in any way changing the bridge 4.

I show also in Fig. 2 a pair of binding posts 56 which are connected across the alternating current input of the rectifier 21. It will be recalled that when current is supplied by 21 to the resistor 22 the voltage set up across 22 is the component of the resultant voltage applied to the magnetic amplifier 35 which tends to increase the heat delivered. Should the voltage across 22 be zero, therefore, the valve 2 will remain closed at all times so that there would be no heat delivered. It is a requirement in heating systems of this type that the automatic cycling control at certain times or under certain conditions be made inoperative. The binding posts 56 are for this purpose. If these binding posts be short-circuited, the rectifier 21 will at all times be de-energized; accordingly, no heat will be delivered.

The linear amplifier 60 may comprise any form of magnetic amplifier having the desired characteristics. In order to show clearly the connections of the linear amplifier in relation to the arrangements of Fig. 1, I show in Fig. 3 the internal connections of the linear amplifier. In Fig. 3 I show a pair of binding posts 61 for supplying the linear amplifier with alternating current energy from the source 13, input binding posts 62 and 63, and output binding posts 64 and 65.

The linear amplifier shown in Fig. 3 comprises three stages.

Figure 4:
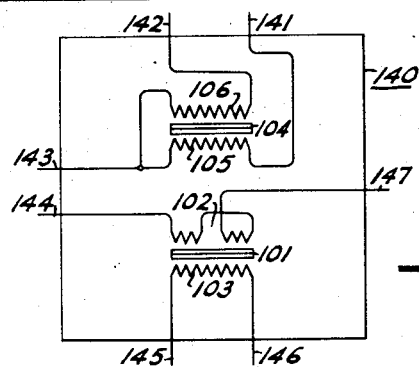
Fig. 4 is a fragmentary diagram showing details relating to Fig. 3.

In order to simplify the drawing in Fig. 3 and to avoid repetition of detail I have indicated, in the diagram, the collective group comprising the saturating reactor and transformer pertaining to the second and third stages, in the manner depicted in Fig. 4 at 140. Thus I show in Fig. 4 the core 101 of a saturating reactor, the A. C. winding 102 and the saturating winding 103, together with a transformer having a core 104, a primary winding 105 and a secondary winding 106. I show also connections therefrom at 141, 142, 143, 144, 145, 146 and 147. Resistors 107 and 108 control the potentials applied to the windings 105 and 102 and hence control the operation of the saturable reactor circuit included within the rectangle labeled 140.

The linear amplifier 60 includes a resistor 66 which is of fixed value supplied with rectified direct current by the rectifier 114 of the last stage. The output binding posts 64 and 65 are connected to the extremities of the resistor 66. For a more complete explanation of the action of the linear amplifier reference may be made to my aforementioned copending application. Briefly, the input of the first stage is excited by the difference between the input and output voltages; that is to say, the output of the bridge 4 applied at binding posts 62, 63 and the voltage across the resistor 66. In accordance with the regulating action of the linear amplifier the voltage across 66 is at all times maintained in exact equality with the voltage at binding posts 62 and 63.

Referring again to Fig. 1, I show to the right of the cycling unit 50 a temperature control unit 70, the function of which is automatically to interrupt the intermittent action of the cycling unit, so as to cut off the heat entirely, whenever the temperature to which the thermal element 3 is exposed reaches a value such that no heating is required.

It will be obvious to those skilled in the art that in accordance with the action of the bridge 4 and the linear amplifier 60 as hereinbefore described and explained this result can be achieved by the provision of apparatus which will cut off the heat whenever the voltage between conductors 23 and 24 reaches a predetermined level.

Figure 5:
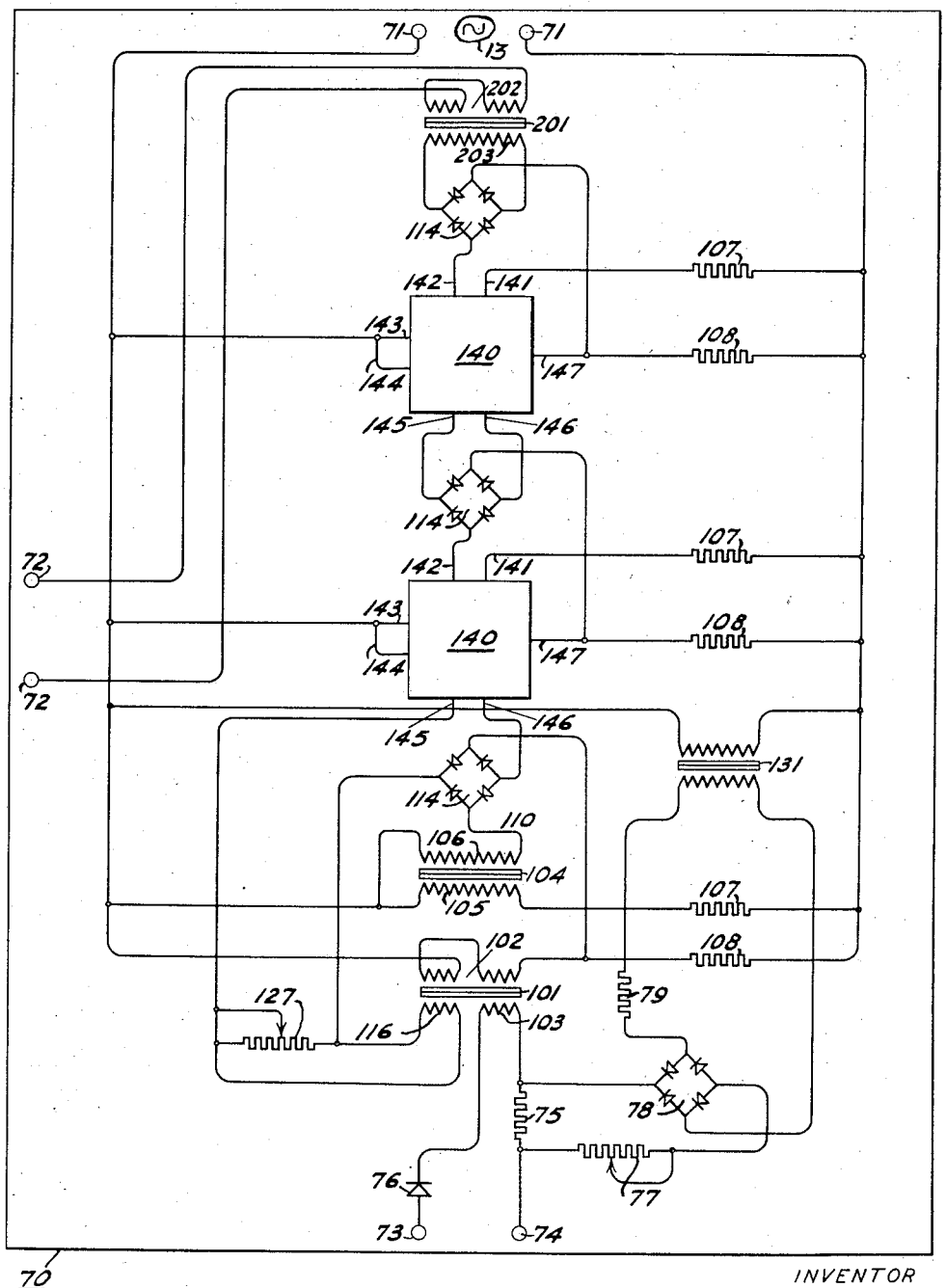
Fig. 5 is a view showing further details pertaining to the embodiment shown in Fig. 1.

I show in Fig. 5 the structure necessary to accomplish this result. The temperature control unit 70 is supplied with A. C. power from the source 13 through a pair of binding posts 71. The function and purpose of the apparatus shown in Fig. 5 is in effect to short-circuit the binding posts 56 of Fig. 2, whenever a predetermined voltage between conductors 23 and 24 is exceeded. However, I prefer to avoid where possible contacts or moving parts and accordingly I show in Fig. 5 a saturating reactor having a core 201, A. C. winding 202, and a direct current saturating winding 203. I connect the A. C. winding 202 to a pair of binding posts 72 which, as shown in Fig. 1 are connected to binding posts 56.

The characteristics of the core 201 and A. C. winding 202 are designed so that when there is no D. C. saturating current flowing in 203, the reactance of 202 is of a relatively high value such that its connection in parallel with the rectifier 21 (see Fig. 2) has no substantial effect upon the magnitude of the current flowing in the resistor 22. On the other hand, when the core 201 is fully saturated by a substantial direct current in 203 the reactance of 202 is reduced to such a low value that it effectively short-circuits 21 so that the current delivered to the resistor 22 by 21 is of a negligible order of magnitude. That is to say, flow of a substantial saturating current in 203 interrupts the cycling action and stops delivery of heat to the system.

I show in Fig. 5 a three-stage magnetic amplifier arranged to furnish, with a sharp cut-off action, a direct current output of sufficient magnitude to deliver the necessary current to 203 when the voltage between the conductors 23 and 24 reaches the value at which it is desired that the intermittent central action be rendered inoperative. For example, in a system for controlling the supply of heat to a building in accordance with the temperature of the outside air, this may take place at or near an outdoor air temperature of 70° F.

This three-stage amplifier may be of any suitable type having the requisite characteristics. I show in Fig. 5, by way of example, an arrangement similar in essential structure to the linear amplifier arrangement which I have shown in Fig. 3. For example, the second and third stages may if desired, be identical. However, while the material structure of the first stage may be somewhat similar to the arrangement of Fig. 3, the adjustments and circuit constants are different because the desired action and characteristics are different. Thus, in the linear amplifier arrangement of Fig. 3 a "floating" type of characteristic is desired. In the cut-off control of Fig. 5 the type of action desired is a "snap" or "trigger" action. Accordingly, the resistance of the diverter 127 may be made somewhat higher so as to increase the feed-back action. Also if desired, the resistors 128 and 130 and their associated rectifier 129, shown in Fig. 3, may be omitted since this structure is of particular pertinence in respect of the "floating" type of action.

I show in Fig. 5 a pair of binding posts 73 and 74, to which the input winding 103 of the first stage is connected in series with a resistor 75 and a half-wave rectifier 76. Rectified current is supplied to the resistor 75 through an adjustable resistor 77 from a rectifier 78 supplied through a further resistor 79 from the secondary winding of an isolating transformer 131 energized from the source 13 through binding posts 71. The rectifier 78 is connected to the resistor 75 so that the voltage drop across the latter is in opposition to the temperature-indicating voltage, derived from the linear amplifier 60, which is applied by conductors 23, 24 to binding posts 73, 74.

It will be apparent to those skilled in the art, that the action of the half-wave rectifier 76 will be such that at all times when the voltage across 75 is greater than the temperature-indicating voltage, the resultant difference voltage will be in the opposite direction to that in which 76 is conducting; and accordingly under this condition the input current in 103 will be zero. The adjustment of the amplifying arrangements in Fig. 5 is made so that the current in 203 is likewise zero.

The temperature at which cut-off occurs may be adjusted by means of the resistor 77 which latter if desired may be calibrated in degrees F. Suppose for example, 77 be set so that the voltage across 75 is exactly equal to the output voltage of the bridge 4 at 70° F. An exactly equal voltage appears between the conductors 23, 24 and is applied to binding posts 73, 74. With this setting at all times when the temperature is below 70° F., the voltage across 75 will be greater than that applied to binding posts 73, 74, and accordingly no current will flow in 203.

The trigger action of the first stage may be so adjusted that, when there is no current in the first stage input winding 103, the first stage retains a condition of stability at which the output current is at a minimum value such that the current in 203 is zero.

If, now, the temperature rises to 70° F. any further increase in temperature will result in a difference voltage of the opposite polarity, under which condition the half-wave rectifier 76 is conducting.

Accordingly, current will now flow in the winding 103 in a direction additive in respect of the feed-back winding 116 as a result of which the first stage will transfer abruptly to its other condition of stability in which an increased output current is delivered to the second stage. This output amplified by the second and third stages results in substantial current in the winding 203. Accordingly, the desired shut-off effect is brought about and no further heat is delivered until such time as the temperature falls below 70° F.

When this occurs, the reverse action takes place. As soon as the voltage delivered to binding posts 73, 74 no longer exceeds that across the resistor 75, current in 103 is reduced to zero. The first stage changes abruptly to its previous state of stability in which the output is of a low value and current in the winding 203 ceases to flow. Thus the normal functioning of the cycling unit is resumed and heat is intermittently supplied to the system under the control of the thermal element 3 in accordance with the prevailing temperature.

With respect to the above described cut-off action, I wish particularly to point out that by the use of the half-wave rectifier 76 and the arrangements for energizing the input windings 103 in accordance with the difference between the voltage across 75 and the temperature-indicating voltage, substantial energization of the winding 103, sufficient to "trigger" the first stage is obtained with a change of temperature of less than one degree F. It is to be clearly understood that when the first stage is properly adjusted to give the type of action specified, characterized by the existence of two definite conditions of stability, there should be no value of temperature which, if continuously maintained, can result in a sustained value of current in the winding 203 of other than either zero or its maximum value. While at the transition point the change from one condition to the other is not instantaneous and may take several seconds, nevertheless the change, once initiated, in either sense, is either completed, or the previous condition is reverted to.

While I have shown in Fig. 1 by way of example two different control units 50 and 70 both energized commensurately with temperature, by the linear amplifier 60. I wish it to be clearly understood that without departing from the spirit of my invention as many additional control units, for other desired purposes, as may be required, may be supplied from the linear amplifier 60. Many such requirements will readily occur to those skilled in the art. For example, it is often required that different settings or adjustments of the controls be automatically made during different times of day or night, and in accordance with the temperature condition then existing. For example, I may provide a further cycling unit similar to that shown in Fig. 1 at 50 but operating on a twenty-four hour cycle. Such a unit may cut in or cut out the cycling unit 50 in Fig. 1 in exactly the same manner as is shown in respect of the temperature control unit 70. Such a twenty-four hour cycling unit, connected in a similar manner to the arrangement shown in Fig. 2 and responsive to the temperature indicating voltage in like manner will cause the cyling unit to cut in or cut out at times of day or night which will not be fixed but will be a function of the temperature.

I show therefore, entirely by way of illustration, in Fig. 1, two additional control units, 80 and 90 energized from the linear amplifier 60 in a manner similar to that in which the cyling unit is connected and which are intended to represent any such special control functions as may be desired in any particular application. These additional control units are similar to control unit 70 in all essential respects. Each of these additional units has a pair of binding posts at its upper end, as seen in Fig. 1, corresponding to binding posts 71 of temperature control unit 70 and it will be noted that these binding posts, like binding posts 71, are connected to the source of alternating current 13. Each of these additional control units is also possessed of a pair of binding posts at their lower end, as viewed in Fig. 1, corresponding to binding posts 73 and 74 respectively of temperature control unit 70. Like binding posts 73 and 74 they are connected to conductors 23 and 24 respectively for receiving the temperature-indicating voltage applied thereby. It will further be noted that each additional control unit has a pair of binding posts on its left side as seen in said Fig. 1, corresponding to binding posts 72 of control unit 70.

Although I have chosen a particular embodiment of my invention for the purpose of explanation, many modifications thereof will be apparent to those skilled in the art to which it pertains. My invention, therefore, is not to be limited except in so far as is necessitated by the prior art and the spirit of the appended claims.

What I claim as new and desire to secure by Letters Patent of the United States is:

1. A heat-regulating system, comprising: control means for permitting and inhibiting the delivery of heat; a thermal resistance element responsive to temperature of a preselected location; an electrical bridge including said thermal resistance element as one arm thereof; means for energizing said bridge across a first conjugate arm thereof from a direct current source; means for deriving from the second conjugate arm of said bridge a direct current voltage varying in accordance with said temperature; a linear response magnetic amplifier energized from said second conjugate arm of said bridge; means for producing a direct current voltage fluctuating continuously between predetermined limits; and means energized in accordance with the difference between said magnetic amplifier output voltage and said fluctuating voltage for causing intermittent operation of said control means in accordance with said temperature.

2. A heat-regulating system, comprising: control means for permitting and inhibiting the delivery of heat; a thermal resistance element responsive to temperature of a preselected location; an electrical bridge including said thermal resistance element as one arm thereof; means for energizing said bridge across a first conjugate arm thereof from a direct current source; means for deriving from the second conjugate arm of said bridge a direct current voltage varying in accordance with said temperature; a linear response magnetic amplifier energized from said second conjugate arm of said bridge; means for producing a direct current voltage fluctuating continuously between predetermined limits; and means energized in accordance with the difference between said magnetic amplifier output voltage and said fluctuating voltage for causing intermittent operation of said control means in accordance with said temperature, together with means also energized by and responsive to said output voltage derived from said linear response magnetic amplifier for deactivating said fluctuating voltage means when said temperature exceeds a preselected value.

3. A heat-regulating system, comprising: control means for permitting and inhibiting the delivery of heat; a thermal resistance element responsive to temperature of a preselected location; an electrical bridge including said thermal resistance element as one arm thereof; means for energizing said bridge across a first conjugate arm thereof from a direct current source; means for deriving from the second conjugate arm of said bridge a direct current voltage varying in accordance with said temperature; a plurality of independent control devices for controlling the delivery of heat differently in accordance with different conditions including a cycling unit for periodically operating said control means; and means for energizing said independent control devices in accordance with said temperature, comprising a linear response magnetic amplifier energized from said second conjugate arm of said bridge.

4. An electrical control system, comprising: a control device for permitting or inhibiting the continuation of a process; means responsive to a condition in said process; an electrical element responsive to said means; means for deriving from said electrical element a direct current voltage varying in accordance with the condition of said process; a linear response magnetic amplifier energized from said electrical element; means for producing a direct current voltage fluctuating continuously between predetermined limits; and means energized in accordance with the difference between said magnetic amplifier output voltage and said fluctuating voltage for causing intermittent operation of said control devices in accordance with said first-mentioned means.

ALAN S. FITZ GERALD.

REFERENCES CITED

The following references are of record in the file of this patent:

UNITED STATES PATENTS

| Number | Name | Date |
|---|---|---|
| 1,979,311 | Bordon | Nov. 6, 1934 |
| 2,216,301 | Sparrow | Oct. 1, 1940 |
| 2,249,844 | Martin | July 22, 1941 |
| 2,277,849 | FitzGerald | Mar. 31, 1942 |
| 2,297,836 | Levy | Oct. 6, 1942 |
| 2,338,423 | Geyger | Jan. 4, 1944 |
| 2,402,210 | Ryder et al. | June 18, 1946 |